United States Patent Office 3,318,871
Patented May 9, 1967

3,318,871
PRODUCTION OF ω-LAUROLACTAM
Horst Metzger and Hans Urbach, Ludwigshafen (Rhine), Germany, assignors to Badische Anilin- & Soda-Fabrik Aktiengesellschaft, Ludwigshafen (Rhine), Germany
No Drawing. Filed Dec. 27, 1961, Ser. No. 162,580
Claims priority, application Germany, Jan. 7, 1961, B 60,753
7 Claims. (Cl. 260—239.3)

The present invention relates to the production of ω-laurolactam, which is a substance having great importance for the production of polyamides.

It is known that ω-laurolactam is obtained by subjecting cyclododecanone oxime to Beckmann rearrangement with sulfuric acid. Cyclododecanone oxime which is necessary as initial material for the said reaction must be prepared by a relatively costly method, namely either by acyloin condensation of decanedicarboxylic acid to form cyclododecanolone, partial reduction to cyclododecanone and reaction of the latter with hydroxylamine to form the oxime, or by trimerization of butadiene to cyclododecatriene, epoxidation and hydrogenation to epoxycyclododecane, isomerization to cyclododecanone and reaction of the latter to the oxime. A method has recently been described in which cyclododecane (accessible by trimerization of butadiene and subsequent hydrogenation) is reacted direct to cyclododecanone oxime hydrochloride with nitrosating agents, such as nitrosyl chloride, with simultaneous exposure to light, if desired in the presence of hydrogen chloride.

All these methods have the disadvantage that they require several stages, that in some cases only moderate yields of laurolactam are obtained, that large amounts of chemical reagents and of energy are required and that apparatus of expensive or easily breakable materials must be used. Moreover the lactam obtained according to the said methods often does not satisfy purity requirements expected of an initial product for the production of valuable polyamides, so that the lactam must be purified by additional measures.

It is an object of this invention to provide a new process for the production of very pure ω-laurolactam. Another object of the invention is to provide a process for the production of laurolactam, in which an initial material is used which has not hitherto been used for this purpose. A further object of the invention is to provide a process for the production of ω-laurolactam in which laurolactam is obtained in a one-stage process from cyclododecanecarboxylic acid.

These and other objects are achieved by causing cyclododecanecarboxylic acid or a salt thereof and an equivalent amount or an excess up to 2 equivalents of a nitrosating agent to act on each other in the presence of sulfuric acid or oleum.

When using nitrosyl sulfate as the nitrosating agent, the process may be represented by the following formulae:

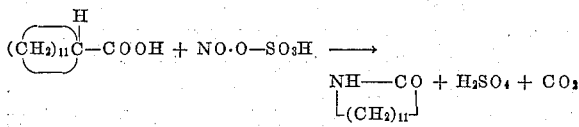

ω-Laurolactam thus obtained in a single stage from cyclododecanecarboxylic acid has, even in the crude state, a high degree of purity such as has not been obtainable by any of the methods hitherto known.

Cyclododecanecarboxylic acid or its salts (preferably alkali metal or alkaline earth metal salts), to be used as initial material for the process, have not yet been described in the literature. In order to prepare them it is possible for example to start from cyclododecatriene-(1,5,9) obtainable by trimerization of butadiene, to convert the cyclododecatriene by oxo synthesis in the conventional way into monohydroxymethylcyclododecane and then to oxidize the latter to the carboxylic acid, for example by the conventional method of oxidative alkali fusion.

Nitrosating agents suitable for the process according to the invention are compounds derived from nitrous acid, such as nitrosylsulfuric acid, nitrosylsulfuric anhydride, nitrosyl chloride, or alkyl nitrites, and other nitrosating agents, such as sodium nitrite or dinitrogen trioxide. It is preferable to use nitrosylsulfuric acid or its anhydride which can be prepared for example by heating nitrosylsulfuric acid in sulfuric acid or oleum and can be used direct in this form without further isolation. The nitrosating agent may be used direct or in solution in sulfuric acid or oleum, for example in concentrations of 10% by weight or more. 20 to 60% by weight solutions in sulfuric acid or oleum are preferred.

The ratio of nitrosating agent to cyclododecanecarboxylic acid may be varied within wide limits. It is necessary to use at least an equivalent amount of nitrosating agent to secure good yields and conversions. The term "equivalent amount" means that one mole of a nitrosating agent with one nitrosyl radical per mole or ½ mole of a nitrosating agent with two nitrosyl radicals is used per mole of cyclododecanecarboxylic acid. It is advantageous to use an excess of nitrosating agent up to 2 equivalents. We prefer a ratio of cyclododecanecarboxylic acid to nitrosating agent of 1:1.1 to 1:1.5 equivalents. Larger excesses may be used however, although this is uneconomical.

The ratio of cyclododecanecarboxylic acid to sulfuric acid or oleum may also be varied within wide limits, but at least 1 mole of sulfuric acid should be used for each mole of free cyclododecanecarboxylic acid. When starting from an alkali or alkaline earth metal salt of the carboxylic acid, such an amount of sulfuric acid should be used that after the cyclododecanecarboxylic acid has been set free from the salt there is still enough sulfuric acid left to satisfy the abovementioned lower limit. When the nitrosating agent used has been derived from sulfuric acid, as in the case of nitrosylsulfuric acid or its anhydride, the sulfuric acid contained therein must be taken into account.

The cyclododecanecarboxylic acid should be present in the solution to at least the extent of 10% by weight; it is possible but not economical to carry out the process with lower concentrations.

The concentration of the sulfuric acid may also be varied within wide limits. It is preferred to use a 100% sulfuric acid, so-called monohydrate, and/or oleum, i.e. sulfuric acid containing up to about 65% by weight of sulfur trioxide dissolved therein. The reaction may also be carried out with aqueous sulfuric acid containing at least 75%, for example 80% of sulfuric acid; however, longer reaction periods and higher reaction temperatures are required and the conversion is less.

In general the reaction is carried out at temperatures between 0° and 150° C. and the use of the higher oleum concentrations permits carrying out the reaction at lower temperatures. To achieve good yields with good conversions in relatively short periods, it is recommendable to maintain a temperature of at least 35° C. during the reaction. The optimum reaction temperature at a given acid concentration and concentration of nitrosating agent may readily be determined by preliminary experiment. The course of the reaction can be recognized by a considerable but not too vigorous formation of carbon dioxide and also by liberation of reaction heat which may have to be abstracted by cooling. To improve the initiation of the reaction, a small amount, for example 1 to 20% by weight, say 10% by weight, of laurolactam may be added to the mixture of sulfuric acid and cyclododecanecarboxylic acid, or the reaction mixture may be heated temporarily to a somewhat higher temperature until it is evident that the reaction has begun. The beginning of the reaction may be detected by the formation of carbon dioxide.

A preferred embodiment of the process according to this invention comprises introducing the nitrosating agent, dissolved in sulfuric acid or oleum, into a solution or suspension of cyclodedecanecarboxylic acid or a salt thereof in sulfuric acid or a solvent, for example cyclohexane, at such a rate that carbon dioxide escapes continuously. When all the nitrosating agent has been added, the whole is stirred for a short time and the reaction mixture then poured onto ice or into water. The laurolactam formed is thus precipitated, in some cases in common with unreacted cyclododecanecarboxylic acid, without it having been necessary previously to neutralize the reaction mixture.

It is however also possible to proceed by adding the nitrosating agent and the sulfuric acid separately but simultaneously to the cyclododecanecarboxylic acid which is preferably dissolved in sulfuric acid or another solvent.

When working continuously it is advantageous to bring the solution of cyclododecanecarboxylic acid or a salt thereof, nitrosating agent and sulfuric acid or oleum together, or separately but simultaneously, into a sufficiently large and adequately heated reaction zone and then after a residence period depending on the reaction temperature, to remove the mixture continuously, for example by an overflow.

Almost colorless crude lactam which has been precipitated from the reaction mixture by dilution with water can be purified by distillation, sublimation or recrystallization. If the laurolactam contains cyclododecanecarboxylic acid by reason of incomplete conversion, the mixture of laurolactam and cyclododecanecarboxylic acid may be dissolved in an inert solvent, for example benzene or chloroform, and the carboxylic acid removed therefrom by extraction with alkali hydroxide or carbonate and if desired recovered by acidifying the alkaline extract. Separation may also be effected by distillation or recrystallization.

Although a method is already known according to which caprolactam is obtained by treating cyclohexanecarboxylic acid in the presence of sulfuric acid or oleum with nitrosating agents, it could not have been foreseen that this reaction would also be applicable to cyclododecanecarboxylic acid and its salts because, contrasted with cyclohexanecarboxylic acid, cyclododecanecarboxylic acid undergoes decomposition with a violent reaction with sulfuric acid or oleum at the temperatures necessary for conversion to lactam. In the process according to this invention it is surprising that no decomposition of cyclododecanecarboxylic acid takes place but that laurolactam is obtained in yields of up to 96% of the theory with practically quantitative conversions, whereas in the abovementioned methods for the production of caprolactam starting from cyclohexanecarboxylic acid, yields of a maximum of 90% of the theory are obtained at conversions of 61% of the theory or yields of 85% of the theory at conversions of 82% of the theory. Moreover, laurolactam obtained according to this invention without further purification is of a purity such as is only obtainable by the known methods after a purification operation.

The invention is illustrated by, but not limited to, the following examples in which parts are by weight.

*Example 1*

100 parts of monohydroxymethylcyclododecane and 30 parts of potassium hydroxide are heated in a silver autoclave for six hours at 280° C., the pressure built up by the hydrogen formed being released periodically. When the reaction has ended, the solid colorless potassium salt of cyclododecanecarboxylic acid is dissolved in water and 10% hydrochloric acid is added until a weakly acid reaction is obtained. Free cyclododecanecarboxylic acid separates in colorless crystals. This cyclododecanecarboxylic acid may be used after separation for the succeeding rearrangement batch. To test purity, the crystals are filtered off by suction, washed with a little water and dried.

The yield is 99.5 parts of 93% of the theory, the boiling point at 0.8 mm. Hg is 163° to 165° C. and the melting point, after recrystallization from glacial acetic acid, is 98° C. Analysis for

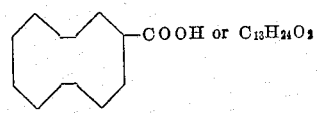

Calculated: C, 73.6%; H, 11.7%, acid number 264; mol. wt. 212. Found: C, 73.6%; H, 11.6%; acid number 261; mol. wt. 205.

A nitrosation mixture containing mainly nitrosylsulfuric acid anhydride and obtained by heating 21.7 parts of nitrosylsulfuric acid, 18.0 parts of 100% sulfuric acid and 22.5 parts of 65% oleum for one hour at 110° to 120° C. with constant stirring is added while stirring well to a solution of 32.0 parts of cyclododecanecarboxylic acid in 24.0 parts of 100% sulfuric acid. About 1 part of the nitrosation mixture is first added cautiously until evolution of carbon dioxide takes place at about 65° C. Then the remainder of the nitrosation mixture is added within 25 minutes at 55° to 60° C. and the whole then stirred at 60° C. until no further carbon dioxide escapes. About twenty minutes are required for this purpose. The reaction mixture is then poured onto 160 parts of ice. Crystals separate which consist mainly of laurolactam. 28.8 parts of practically pure laurolactam is obtained.

To determine the unreacted cyclododecanecarboxylic acid, the laurolactam is dissolved in chloroform, the chloroform solution shaken twice with 2N caustic soda solution and evaporated to dryness. 28.1 parts of practically colorless ω-laurolactam having the melting point 150° to 151° C. is obtained as a residue. By acidifying the alkaline extract and filtering off the resultant precipitate and drying it, 0.65 part of cyclododecanecarboxylic acid having the melting point 95° C. is recovered. Conversion of cyclododecanecarboxylic acid therefore amounts to 98% of the theory. The yield of laurolactam is 94% of the theory with reference to the cyclododecanecarboxylic acid used.

*Example 2*

3 parts of ω-laurolactam is added to a solution of 32.0 parts of cyclododecanecarboxylic acid in 24.0 parts of 100% sulfuric acid and then, while stirring well, a nitrosation mixture of 22.0 parts of nitrosylsulfuric acid, 20.0 parts of 65% oleum and 6.0 parts of 100% sulfuric acid, which has previously been heated to 120° C. for an hour, is added within 30 minutes. When all the nitrosation mixture has been added, the whole is stirred for fifty minutes at 60° C., poured onto 160 parts of ice and the further procedure of Example 1 is followed. No cyclododecanecarboxylic acid is recovered, i.e. conversion is quantitative. The yield of practically colorless laurolactam is 30.5 parts or 92% of the theory. The melting point is 150° C.

*Example 3*

The procedure of Example 1 is followed but 36 parts of the potassium salt of cyclododecanecarboxylic acid in 25 parts of 100% sulfuric acid is used. After the reaction has ended, the whole is poured onto 160 parts of ice and the deposited laurolactam is separated. The yield is 31.1 parts or 94% of the theory.

Example 4

A reaction vessel provided with a stirrer and a heatable overflow tube of a length that ensures average residence periods of about 40 minutes in the reaction vessel and of about 15 minutes in the overflow tube is charged with a mixture of laurolactam and oleum as obtained in a previous batch by working, for example, according to Example 1. The mixture is heated to 55 to 60° C., a solution of 400 parts of nitrosylsulfuric acid in 700 parts of 45% oleum is added continuously each hour and, simultaneously 540 parts of fused cyclododecanecarboxylic acid. The temperature in the reaction mixture is maintained at 55 to 60° C. by heating or cooling. The reaction mixture leaving the overflow tube is stirred into water and the crude ω-laurolactam that separates continuously centrifuged and washed with water. After drying, a crude lactam of the melting point 150° C. is obtained in a yield of 95% of the theory.

Similar results are obtained by adding the cyclododecanecarboxylic acid to the reaction mixture in the solid state using suitable metering devices, for example a dosing worm, or dissolved, for example in 100% sulfuric acid.

Example 5

By proceeding as in Example 1, but using the amounts and temperatures specified in the table at the temperatures indicated, the amounts of crude lactam given in the table are obtained.

TABLE

| Experiment No. | Carboxylic acid | | Nitrosyl sulfate | | T., °C. | Reaction period in minutes | Yield of lactam | |
|---|---|---|---|---|---|---|---|---|
| | Parts | Dissolved in parts $H_2SO_4$ or oleum (Concentration) | Parts | Dissolved in parts $H_2SO_4$ or oleum (Concentration) | | | Parts | Percent of theory |
| a | 27.0 | 20 (100%) | 16.3 (1:1) | 35 (38% $SO_3$) | 60 | 50 | 23.0 | 92 |
| b | 27.0 | 20 (100%) | 24.5 (1:1.5) | 35 (46% $SO_3$) | 50 | 65 | 23.7 | 95 |
| c | 27.0 | 20 (80%) | 20.0 (1:1.2) | 70 (50% $SO_3$) | 60 | 60 | 23.5 | 94 |
| d | 27.0 | 20 (10% $SO_3$) | 20.0 (1:1.2) | 35 (20% $SO_3$) | 20 | 2,100 | 21.0 | 84 |
| e | 27.0 | 150 (100%) | 20.0 (1:1.2) | 13 (100%+150/65% $SO_3^+$) | 60 | 75 | 23.2 | 93 |
| f | 27.0 | 20 (100%) | 18.0 (1:1.1) | 30 (100%) | 110 | 70 | 22.0 | 88 |

Example 6

A freshly prepared mixture, prepared at room temperature, of 55 parts of cyclododecanecarboxylic acid, 110 parts of 10% oleum and 40 parts of nitrosylsulfuric acid is slowly introduced from the top into a heatable coil pipe that permits an average residence period of the reaction mixture of about 5 minutes and is heated at 80° C. at the top end and at 130° C. at the bottom third. The initial mixture is added in such a way that the evolution of carbon dioxide is not too vigorous. The reaction mixture leaving the coil pipe at the bottom is stirred into water so that the sulfuric acid concentration does not exceed 50%. Filtration, washing and drying of the crystallisate precipitated gives a crude laurolactam in a good yield.

We claim:

1. A process for the production of ω-laurolactam which comprises mixing a cyclic compound selected from the group consisting of cyclododecanecarboxylic acid, alkali metal salts and alkaline earth metal salts thereof and mixtures of these compounds with a nitrosating agent derived from nitrous acid in the ratio of 1:1 to 1:2 equivalents in the presence of a solvent selected from the group consisting of 75 to 100% sulfuric acid and oleum and with up to 65% of free sulfur trioxide at a temperature between 0° and 150° C.

2. A process for the production of ω-laurolactam which comprises mixing a cyclic compound selected from the group consisting of cyclododecanecarboxylic acid, alkali and alkaline earth metal salts thereof and mixtures of these compounds with a nitrosating agent selected from the group consisting of nitrosylsulfuric acid and nitrosylsulfuric anhydride in the ratio of 1:1 to 1:2 equivalents in the presence of a solvent selected from the group consisting of 75% to 100% sulfuric acid and oleum with up to 65% of free sulfur trioxide at a temperature between 0° and 150° C.

3. A process for the production of ω-laurolactam which comprises mixing a cyclic compound selected from the group consisting of cyclododecanecarboxylic acid, alkali and alkaline earth metal salts thereof and mixtures of these compounds dissolved in a solvent selected from the group consisting of 75% to 100% sulfuric acid and oleum with up to 65% of free sulfur trioxide with a nitrosating agent derived from nitrous acid in the ratio 1:1 to 1:2 equivalents in the presence of a solvent selected from the group consisting of 75% to 100% sulfuric acid and oleum with up to 65% of free sulfur trioxide, at a temperature between 0° and 150° C.

4. A process for the production of ω-laurolactam which comprises mixing a cyclic compound selected from the group consisting of cyclododecanecarboxylic acid, alkali and alkaline earth metal salts thereof and mixtures of these compounds, with a nitrosating agent derived from nitrous acid dissolved in a solvent selected from the group consisting of 75% to 100% sulfuric acid and oleum with up to 65% of free sulfur trioxide, the ratio of said cyclic compound to nitrosating agent being from 1:1 to 1:2 equivalents, in the presence of a solvent selected from the group consisting of 75% to 100% sulfuric acid and oleum with up to 65% free sulfur trioxide at a temperature between 0° and 150° C.

5. A process for the production of ω-laurolactam which comprises mixing a cyclic compound selected from the group consisting of cyclododecanecarboxylic acid, alkali and alkaline earth metal salts thereof and mixtures of these compounds dissolved in a solvent selected from the group consisting of 75% to 100% sulfuric acid and oleum with up to 65% of free sulfur trioxide, with a nitrosating agent derived from nitrous acid dissolved in a solvent selected from the group consisting of 75% to 100% sulfuric acid and oleum with up to 65% of free sulfur trioxide, the ratio of said cyclic compound to nitrosating agent being 1:1 to 1:2 equivalents.

6. A process for the production of ω-laurolactam which comprises mixing a cyclic compound selected from the group consisting of cyclododecanecarboxylic acid, alkali and alkaline earth metal salts thereof and mixtures of these compounds with a nitrosating agent derived from nitrous acid in the ratio 1:1 to 1:2 equivalents in the presence of a solvent selected from the group consisting of 75% to 100% sulfuric acid and oleum with up to 65% of free sulfur trioxide and of 1% to 20% of laurolactam at a temperature between 0° and 150° C.

7. A process for the production of omega-laurolactam which comprises mixing a cyclic compound selected from the group consisting of cyclododecanecarboxylic acid and its derivatives and mixtures of these compounds with a nitrosating agent in a ratio of from 1 to 2 molar equivalents of nitrosating agent per molar equivalent of cyclododecanecarboxylic acid in the presence of sulfuric acid or oleum.

References Cited by the Examiner
UNITED STATES PATENTS 3,022,291  2/1962  Muench et al. _____ 260—239.3

FOREIGN PATENTS 1,238,981  7/1960  France.

OTHER REFERENCES

Australian abstracts Nos. 52,901/59 and 52,908/59, Mar. 24, 1960, and 58,823/60, Sept. 29, 1960.

WALTER A. MODANCE, *Primary Examiner.*
IRVING MARCUS, *Examiner.*
ROBERT T. BOND, *Assistant Examiner.*